Nov. 22, 1949    W. J. D. VAN DIJCK    2,488,884
APPARATUS FOR CONTACTING IMMISCIBLE LIQUIDS
Filed July 13, 1946    2 Sheets-Sheet 1
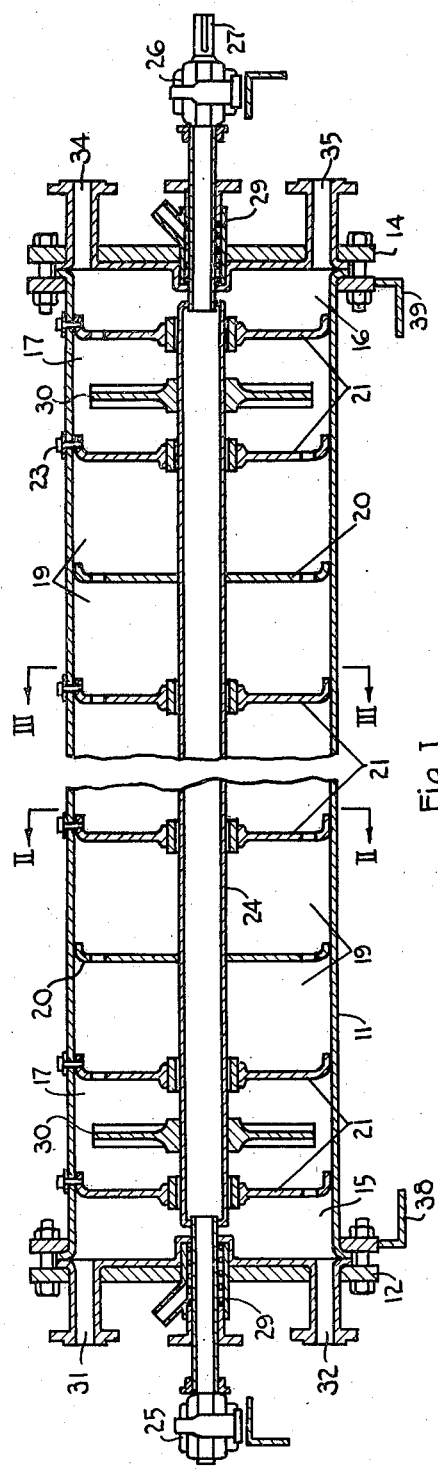
Fig. I
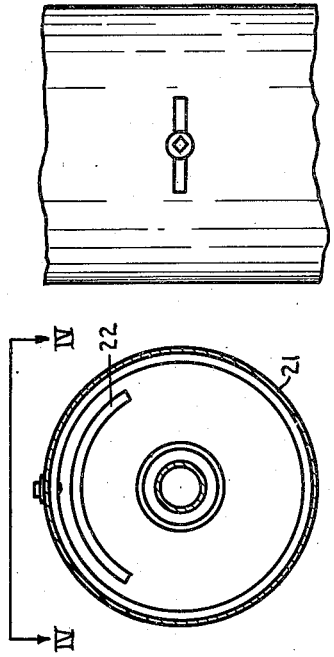
Fig. III
Fig. II
Fig. IV
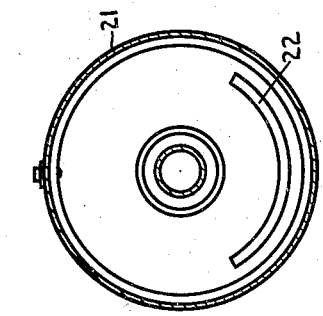
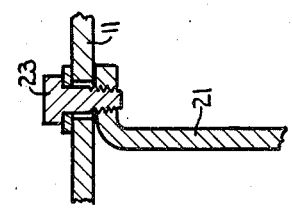
Fig. Ia
Inventor: Willem J. D. Van Dijck
By his Attorney: James Todorovic Nov. 22, 1949     W. J. D. VAN DIJCK     2,488,884
APPARATUS FOR CONTACTING IMMISCIBLE LIQUIDS
Filed July 13, 1946     2 Sheets-Sheet 2
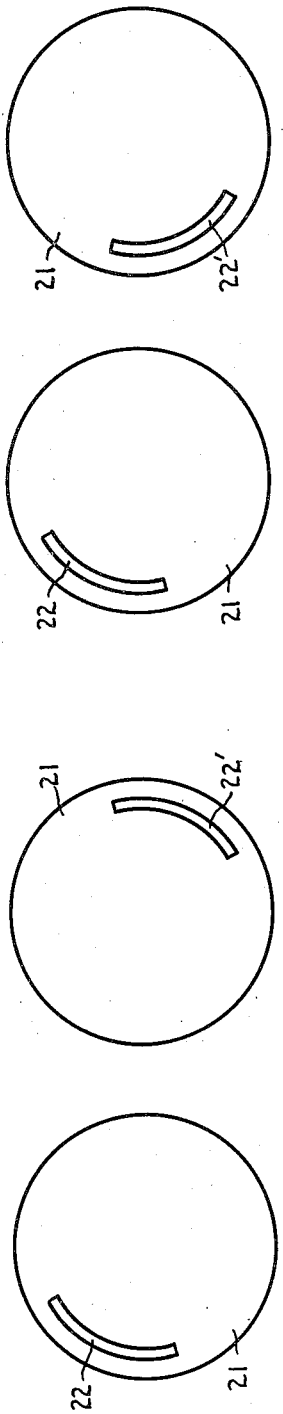
Fig. V
Fig. VI
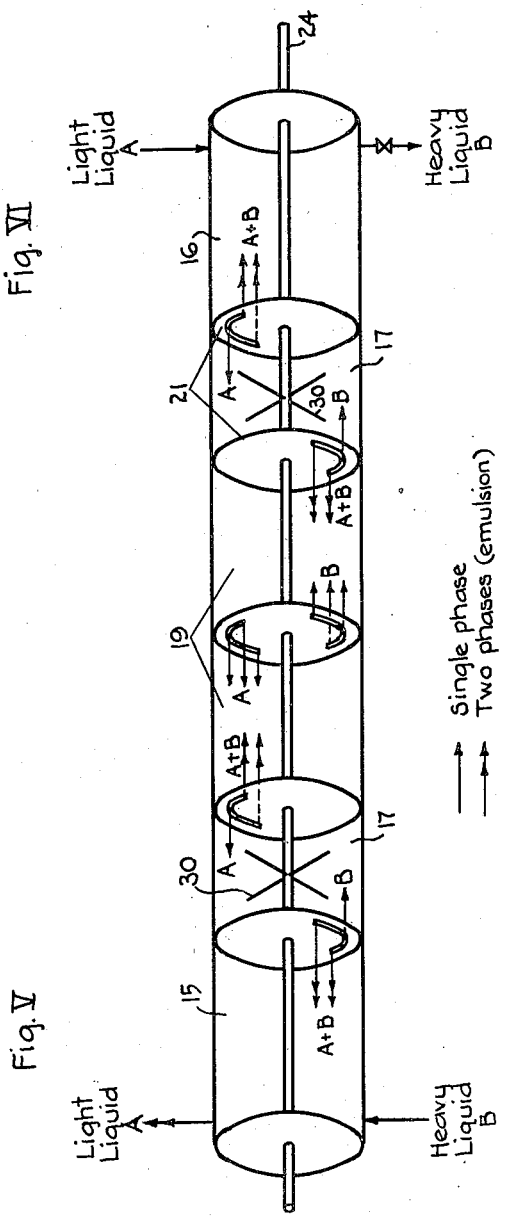
Fig. VII
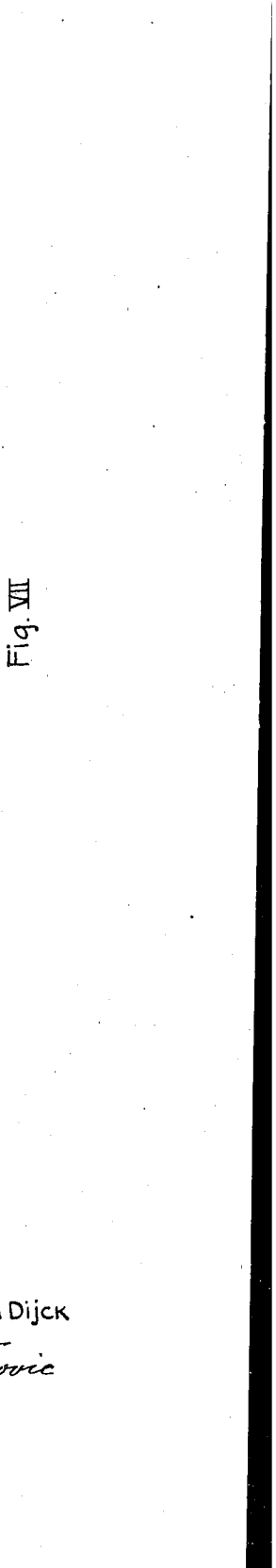
Inventor: Willem J.D. Van Dijck
By his Attorney: James Todorovic Patented Nov. 22, 1949

2,488,884

UNITED STATES PATENT OFFICE 2,488,884

APPARATUS FOR CONTACTING IMMISCIBLE LIQUIDS

Willem Johannes Dominicus van Dijck, The Hague, Netherlands, assignor to Shell Development Company, San Francisco, Calif., a corporation of Delaware Application July 13, 1946, Serial No. 683,323
In the Netherlands July 19, 1945

3 Claims. (Cl. 259—9)

This invention relates to a novel apparatus for contacting immiscible liquids with each other for the purposes of extractiton, chemical treatment or the like, and more particularly to an apparatus adapted for carrying out such contacting in countercurrent relationship of the two liquids. The invention relates more particularly to an apparatus consisting of a plurality of treating zones or stages arranged in contiguous and substantially horizontal relationship and having communicating means between the zones each alternate zone containing an agitating means, the end-zones being characterized as quiescent or separating or stratifying zones and each end-zone containing an inlet and an outlet for the liquids undergoing treatment.

It is an object of the present invention to provide an improved apparatus for countercurrently contacting immiscible liquids having different densities. Another object is to provide such an apparatus in which a driving or pumping force for driving the liquids through the apparatus is attained even though the several stages are arranged horizontally. Still another object is to provide such an apparatus in which the forces produced in the mixing spaces through the stirring action may be controlled to produce an adjustable pumping-action. A further object is to provide apparatus of the type described with means adapted to automatically minimize and/or prevent overloading of the setting zones.

It has now been discovered that the foregoing and other objects and advantages may be attained by the combination of a pluraliy of stages arranged in contiguous and substantially horizontal relationship and having asymmetrical communicating means between the stages, each alternate stage containing an agitating means, each stage intermediate thereof comprising a settling zone, the end stages being characterized as quiescent zones and each end stage containing an inlet and an outlet for the liquids undergoing treatment. The asymmetrical communicating means may be adapted to be adjusted with respect to axes of the respective contacting zones and/or with respect to one another. Generally described, the communicating means provided in the apparatus in accordance with this invention, comprise partition means provided with openings, separating the mixing and settling spaces, the partition means being positioned relative to one another so that successive partition means have their openings arranged asymmetrically. More specifically, these partitions preferably are provided with openings extending only over a part, preferably over not more than about one-third of the circumference thereof, the openings in each partition lying substantially everywhere at an equal distance from the center line of the axis of the agitating means. Further the position of these openings is adjustable, e. g. by the partitions being rotatable in their planes. Normally the openings of the partitions forming the two sides of a mixing-space will be diametrically opposed. However, it will be readily understood from the description of the invention that other asymmetrical arrangements may be utilized in various applications of the present invention.

The invention will now be described more fully with reference to the accompanying drawings, generally illustrating at least one practical embodiment of a novel combination of means for carrying out the steps of the method involved in the use of the apparatus for effecting desired separations, chemical treatments, or the like, wherein like characters of reference designate corresponding parts throughout the several views, and in which drawings:

Fig. I is a sectional side elevation of an embodiment of the apparatus in accordance with the invention;

Fig. Ia is a magnified view of a fragmentary section of the apparatus as shown in Fig. I;

Fig. II is a section taken along line II—II of Fig. I and is in part a front elevation of a partition;

Fig. III is a section taken along line III—III of Fig. I and is in part a front elevation of a partition having a communicating means asymmetrically positioned with respect to the communicating means of the partition shown in Fig. II;

Fig. IV is a top elevational view along line IV—IV of Fig. II of a segment of the apparatus at line II—II;

Fig. V represents diagrammatically another arrangement of cooperating partitions having the communicating means therein asymmetrically positioned with respect to each other;

Fig. VI represents diagrammatically still another arrangement of cooperating partitions having the communicating means therein asymmetrically positioned with respect to each other; and Fig. VII is a schematic diagram of the flow of contacting liquids through the apparatus of the invention when in operation.

Referring now to the drawings in more detail, 11 is a substantially horizontally positioned cylindrical shell provided with end-covers 12 and 14 which may or may not be removable, thus providing a cylindrical vessel. This cylindrical vessel is divided into two-end-compartments 15 and 16 and into a plurality of intermediate compartments which are alternately mixing compartments 17 and settling-compartments 19. The settling-compartments 19 may or may not be provided with baffling means such as a screen 20 which serves to minimize the disturbing action of the stirring action in adjacent mixing-compartments on the liquid in the settling-compartments. Contiguous compartments are separated one from the other by means of rotatable partition means or diaphragms 21 which are provided with openings in or near the circumference thereof and which extend over only a part, preferably over not more than about one-third of the circumference thereof, the opening in each diaphragm, whether continuous such as slots 22 and 22', or discontinuous such as a plurality of smaller holes arranged along an arc, lying everywhere at approximately an equal distance from the center line of the axis of the agitating means which will be described hereinafter. The diaphragms are held in position by suitable means such as shown at 23 and adapted to be rotated or turned by suitable means such as shown in Fig. IV. Other equivalent means for maintaining the diaphragms in position and adapting them to be rotated or turned for desired adjustment will occur to those familiar with the art. The openings of the partitions or diaphragms forming the two sides of a mixing compartment may be positioned so as to be diametrically opposed, as indicated together in Figs. II and III which are cross-sections along lines II—II and III—III, of Fig. I, respectively, and also as shown in Fig. V. However, they may be arranged in relative positions as represented in Fig. VI.

A shaft 24 is provided within the shell 11 and parallel to the axis thereof. In Fig. I, this shaft 24 is shown as being along the longitudinal axis of the shell; however, it will be appreciated that it may be positioned eccentric to the center line of the shell. The shaft 24 is supported in bearings 25 and 26, and suitable means is provided on one or both ends of the shaft as shown at 27 to permit connection to a prime mover by means of pulleys or couplings or the like. Stuffing glands 29 prevent leakage of liquids along the shaft when in motion.

The shaft 24 carries within the mixing-compartments within the cylindrical vessel suitably spaced rotors or stirrers 30 of any desired number and shape and size which when revolving, agitate liquid contained in the mixing compartments, causing intermingling or immiscible liquids in more or less fine emulsions. The diaphragms 21 are so spaced that one pair of them form a substantially enclosed space 19 in which the agitation of rotors 30 is not felt appreciably and is of such size, and provided with baffles 20 or other suitable means, that the emulsion formed in the mixing-compartments may separate due to differences in specific gravity of the liquids in question. Also, baffles 20 may serve to minimize the mixing of emulsions coming from two separate mixing-zones. Such diaphragms may also be placed between each end rotor and end-plates 12 and 14 of the mixing vessel to provide quiescent end-compartments 15 and 16, or they may be omitted and external separating vessels substituted for this purpose.

The diaphragms 21 may be closed on shaft 24 by any suitable means which permits rotation of the shaft without substantial leakage of fluids between compartments between the diaphragms and the shaft. The diaphragms may be provided on their respective faces with suitable means adapted to increase the turbulence or eddy flow in the mixing or agitating compartments and to tend to straighten out eddy flow in the settling or separating compartments, thereby expediting stratification of the immiscible fluids. Openings 31, 32, 34 and 35 are provided for feeding into and discharging from the vessel the materials to be contacted, interacted, and/or otherwise treated. Suitable openings may be provided if desired for sampling the liquids at various steps of the process. Heating and/or cooling means, such as coils and the like, may be provided inside one or more of the compartments within the vessel, or the vessel may be jacketed and thus provided with external heating and/or cooling means. The vessel 11 is supported by means of supports 38 and 39 which, if desired, may be provided with suitable slots to provide for rotation of the vessel 11 about its long axis.

The operation of the device will be better understood by reference to Fig. VII which is a schematic representation of the flow of two immiscible liquids of different specific gravities through the apparatus, in opposite directions, under the pumping action resulting from the combination of the effects of the agitating rotors, the asymmetrically positioned communicating means in the diaphragms, and the difference in densities of the two liquids. Consider first that the rotors are at rest and that all of the compartments are substantially filled with liquid, each compartment containing substantially equal volumes of each liquid. The two liquids will naturally rest in the device in such a manner that the heavier one occupies a lower layer, the lighter one resting on top.

If now the rotors 30 are set in motion, the two liquids in the mixing compartments 17 will be intimately intermingled, but no substantial disturbance of the separated liquids occurs in the separating-compartments 19 and the quiescent end-compartments 15 and 16. Now, consider one of the mixing compartments defined by two of the diaphragms 21 which have communicating means 22 in the form of slots as shown in Fig. II and Fig. III and as represented in Fig. VII. Through part of the two slots mixture passes from the mixing-compartment to the settling-compartments as represented by the double-headed arrows in Fig. VII, designating the two-component mixture of liquids A and B. Through the remaining part of the slots at the intermediate sections thereof the separated liquids proceed from the settling spaces (compartments) into the mixing space (compartment). With proper correlation between the mixing, the length of the arc of the communicating means (slot, plurality of small openings defining an arm, etc.) and the like factors, relatively more light liquid enters the mixing-space from the settling-space on one side of it (right side as shown in Fig. VII) and relatively more heavy liquid enters the mixing-space from the settling-space on the other (left) side of it. Referring to Fig. VII it is seen that heavy liquid B enters a mixing space through a lower portion of the lower communicating means 22, is lifted by means of agitating means 30 (intermixed with light liquid A) to a lower portion of the upper communicating means 22 in the opposite diaphragm through which it (in admixture with A) passes into the next settling-space where it is allowed to separate from liquid A. On account of the greater density of B and its immiscibility with liquid A, liquid B stratifies in a lower layer, thus producing a lifting force on lighter liquid A stratified thereon, which lifting force becomes a driving or pumping force on liquid A in the opposite direction. Similarly, ligher liquid A entering the mixing space through an upper portion of the upper communicating means 22 is forced by the agitating means down to the level of an upper portion of the lower communicating means 22 in the opposite diaphragm, through which it passes into the next settling space. In this settling space, due to its lower specific gravity and immiscibility with liquid B the lighter liquid A stratifies on top of the heavier liquid B. Any confinement on the upper part of the settling space therefore results in a tendency to push the interface level between the two liquids to a lower level, thus exerting a driving or pumping action on liquid B in the opposite direction.

It is thus seen that in general light liquid is forced in one direction and heavy liquid is forced in the opposite direction. Furthermore, this driving or pumping force is attained by providing communicating means (slots and the like) which do not lie on the same level in the separating partitions or diaphragms and each of which communicating means comprises portions or sections at different gravitational (generally vertical) levels. This pumping force is attained by providing that through the slot which extends farthest upward relatively more of the light liquid enters the mixing space through the upper part of this slot, and through the other slot extending further downward relatively more of the heavy liquid enters the mixing space through the lower part of the slot.

In accordance with the present invention, the pumping-action provided by the operations of the apparatus as described may be adjusted by making the diaphragms rotatably adjustable in their planes whereby the relative positions of the slots may be changed. In the event of slots 22 and 22' each lying symmetrically with respect to a horizontal plane through the center line of axis 24 and on the same side of said axis, the pumping-action would be neutralized in the presence of a homogeneous mixture in the mixing-space. However, in case of a not too rapid rotation of the rotor there will be no equal distribution of heavy and light liquid all over the mixing-space, because through the rotation of the rotor there will be more of the heavy liquid on the side where the rotor blades move upward than on the other side where the rotor blades move in a downward direction. As a result the "neutral" position of the slots, i. e. that in which the pumping-action is neutralized, undergoes a rotation in case of a symmetrical position of the slots with respect to a horizontal plane. Similarly, in the case of an asymmetrical arrangement of the slots, the positions of the slots in the respective diaphragms for optimum pumping-action depends upon various factors such as degree of agitation, relative densities of the liquids being contacted, etc. Under different conditions different arrangements of the slots may be found to be more favorable for the desired contacting, pumping action, etc., such as represented in Fig. V and in Fig. VI, the essential requirement for the development of a pumping-action or force being an asymmetrical arrangement of the communicating means in the walls of the mixing-space.

The centrifugal action caused by the rotation of the rotors (stirrers) does not affect the pumping-action on account of the circular shape of the slots. This pumping-action and the concentration of the mixture and therefore the fineness of the emulsion formed may each be adjusted arbitrarily by an alteration of the velocity of the rotor shaft and of the position of the communicating means in the diaphragms 21. Since, with this construction, the pumping-action is thoroughly controlled, a sloping or inclined position for the contacting vessel is no longer an essential requirement, such as is desirable and mostly necessary where one has to rely on the grade or inclination of the separation plane in the several settling-spaces for the passage of the liquids through the vessel. A horizontal tube has the advantage that if the apparatus is out of operation the separation-plane between the two liquids is on the same level (with respect to the shaft) in all the mixing-spaces and upon again putting the apparatus into operation it produces directly the desired mixing-action in each mixing space. With a sloping tube, however, the ratio of the quantities of light and heavy liquid in the several mixing-spaces varies when the apparatus is out of operation, so that upon its being started again the proper action is not directly obtained in all the mixing-spaces.

It has been indicated already that it is possible to subdivide the slots 22 and 22' each into a plurality of openings in juxtaposition. However, the design as one continuous slot has the advantage that the continuity, upon adjustment, is more easily maintained.

The ratio between the parts of a slot where liquid enters the mixing-space and where mixture leaves this space is automatically determined for a given position of the slots in connection with the given set of operating conditions. Thus, for example, if in the settling-spaces, through some cause or other, the velocity at which the separation is accomplished is reduced, a reflux of the purified liquid to the mixing-spaces takes place over smaller parts lying at the ends of the slots. Consequently, the velocity at which the liquids circulate between the mixing and settling-spaces as well as the velocity at which the liquids are forced through the vessel automatically decrease proportionately.

As already pointed out, it is preferable to have the slots or other types of openings which constitute the communicating means in the form of an arc which is at substantially equal distances at all points from the axis of the agitating means, since this arrangement minimizes the affect of centrifugal force imparted to the liquids by a rotating stirrer upon the pumping force or action. However, where the centrifugal motion is eliminated such as by other types of agitating means, communicating means having different designs are suitable for the development of the pumping action. In such cases, the essential requirement is that each communicating means is open for free passage of fluid therethrough at a plurality of points at different levels in the gravitational field or in the field of whatever force is effective in stratifying the immiscible liquids and that the communicating means for a given treating zone are in asymmetrical relationship with respect to a horizontal plane through the given zone.

Thus the present invention provides a novel apparatus of particular utility for contacting immiscible liquids in countercurrent flow, especially for effecting extractions, and the like.

I claim as my invention:

1. An apparatus for the treatment of substantially immiscible liquids which comprises in combination a substantially cylindrical vessel, a plurality of diaphragms dividing said vessel lengthwise into a plurality of treating zones arranged in contiguous relationship, a rotatable shaft along the longitudinal axis of said vessel and carrying rotatable agitating means in alternate treating zones thereby providing mixing-zones, the treating zone intermediate two mixing-zones comprising a settling zone, the end zones comprising separating compartments containing an inlet and an outlet for the liquids undergoing treatment, each diaphragm being provided with a curved slotlike-opening as the only communicating means for adjacent treating zones which opening extends over only a limited portion not more than about one-third of the periphery of the diaphragm and all peripheral section of which opening are at substantially equal normal distances from the center of the rotatable shaft, the two diaphragms forming two walls of a given mixing zone and separating the given mixing zone from the adjacent settling zones being positioned with their openings in asymmetrical relationship one to the other with respect to a horizontal plane through the given mixing zone, and each diaphragm being adapted to be rotated in a plane normal to the axis of the shaft and thereby adapted to have two diaphragms forming two walls of a given treating zone adjustable to secure different asymmetrical relationships of the respective communicating means therein with respect to a horizontal plane through the given treating zone.

2. An apparatus for the treatment of substantially immiscible fluids which comprises in combination a vessel, a plurality of diaphragms dividing said vessel into a plurality of treating zones arranged in contiguous relationship, a rotatable shaft axially disposed in said vessel and carrying an agitating means in at least one of the treating zones thereby providing at least one mixing zone, the treating zones on either side of the mixing zone comprising settling zones, the end zones comprising separating compartments containing an inlet and an outlet for the fluids undergoing treatment, paired diaphragms forming the dividing walls between a given mixing zone and two settling zones adjacent thereto being provided with communicating means between said given mixing zone and the adjacent treating zones, each communicating means being open for free passage of fluid at a plurality of points at different vertical levels and the communicating means in the paired diaphragms being in asymmetrical relationship one to the other with respect to a horizontal plane through the mixing zone and said paired diaphragms being adapted to be rotated in a plane normal to the axis of the shaft and thereby adapted to be adjusted to secure different asymmetrical relationships of the communicating means of the paired diaphragms with respect to a horizontal plane through the mixing zone.

3. An apparatus for contacting continuously and in countercurrent two substantially immiscible liquids of different specific gravity which comprises in combination an elongated cylindrical vessel, a plurality of diaphragms dividing said vessel into a plurality of alternatingly arranged mixing zones and settling-zones, agitating means provided in the mixing-zones, liquid flow communicating means between a mixing-zone and the settling-zones adjacent thereto which communicating means comprise slotlike openings as the only openings in the respective dividing diaphragms extending over only a limited section not more than about one-third of the periphery of the diaphragm and which openings associated with a given mixing-zone are diametrically opposed with respect to a horizontal plane through the given mixing zone, the diaphragms being fixed to the vessel and the whole being adapted to be rotated about the longitudinal axis of the vessel and adjusted to different positions to secure different asymmetrical relationships between said associated diaphragm openings with respect to a horizontal plane through the given mixing-zone.

WILLEM JOHANNES
DOMINICUS VAN DIJCK.

REFERENCES CITED

The following references are of record in the file of this patent:

UNITED STATES PATENTS

| Number | Name | Date |
|---|---|---|
| 2,022,205 | Kramer | Nov. 26, 1935 |
| 2,029,691 | Robinson | Feb. 4, 1936 |

FOREIGN PATENTS

| Number | Country | Date |
|---|---|---|
| 49,301 | Netherlands | Feb. 16, 1940 |